United States Patent [19]
McCord, Jr.

[11] 3,724,519
[45] Apr. 3, 1973

[54] COLLAPSIBLE SAW

[75] Inventor: Wilfred M. McCord, Jr., Louisville, Ky.

[73] Assignee: Vermont American Corporation, Louisville, Ky.

[22] Filed: Apr. 6, 1971

[21] Appl. No.: 131,709

[52] U.S. Cl. .................................................145/33 E
[51] Int. Cl. .............................................B27b 21/02
[58] Field of Search .......145/31 R, 33 R, 33 E, 34 R, 145/34 A, 108 R, 108 A; 108/125

[56] References Cited

UNITED STATES PATENTS 3,245,445  4/1966  Herman.............................145/33 R

FOREIGN PATENTS OR APPLICATIONS 100,057  6/1925  Austria................................145/33 R
201,764  2/1966  Sweden..............................145/33 E Primary Examiner—Robert C. Riordon
Assistant Examiner—Mark S. Bicks
Attorney—Norman L. Wilson, Jr.

[57] ABSTRACT

Ideal compact saws for outdoorsmen are those having a straight frame member and a handle pivotally connected to one end of the frame. A blade is connected across the angle formed by these two members, from the free end of the frame member to the base of the handle to form a triangularly shaped saw. A triangular saw is provided herein which is easier to convert from its collapsed position to its operable position than known saws, and it has no removable parts to get lost.

5 Claims, 6 Drawing Figures

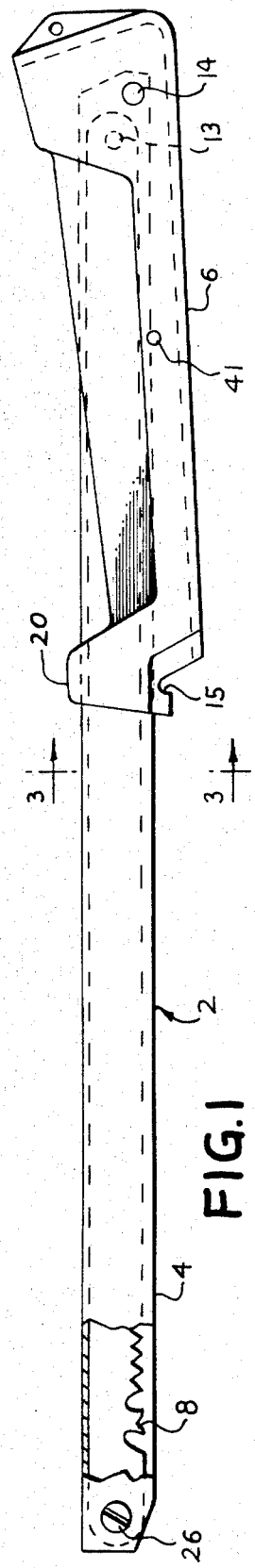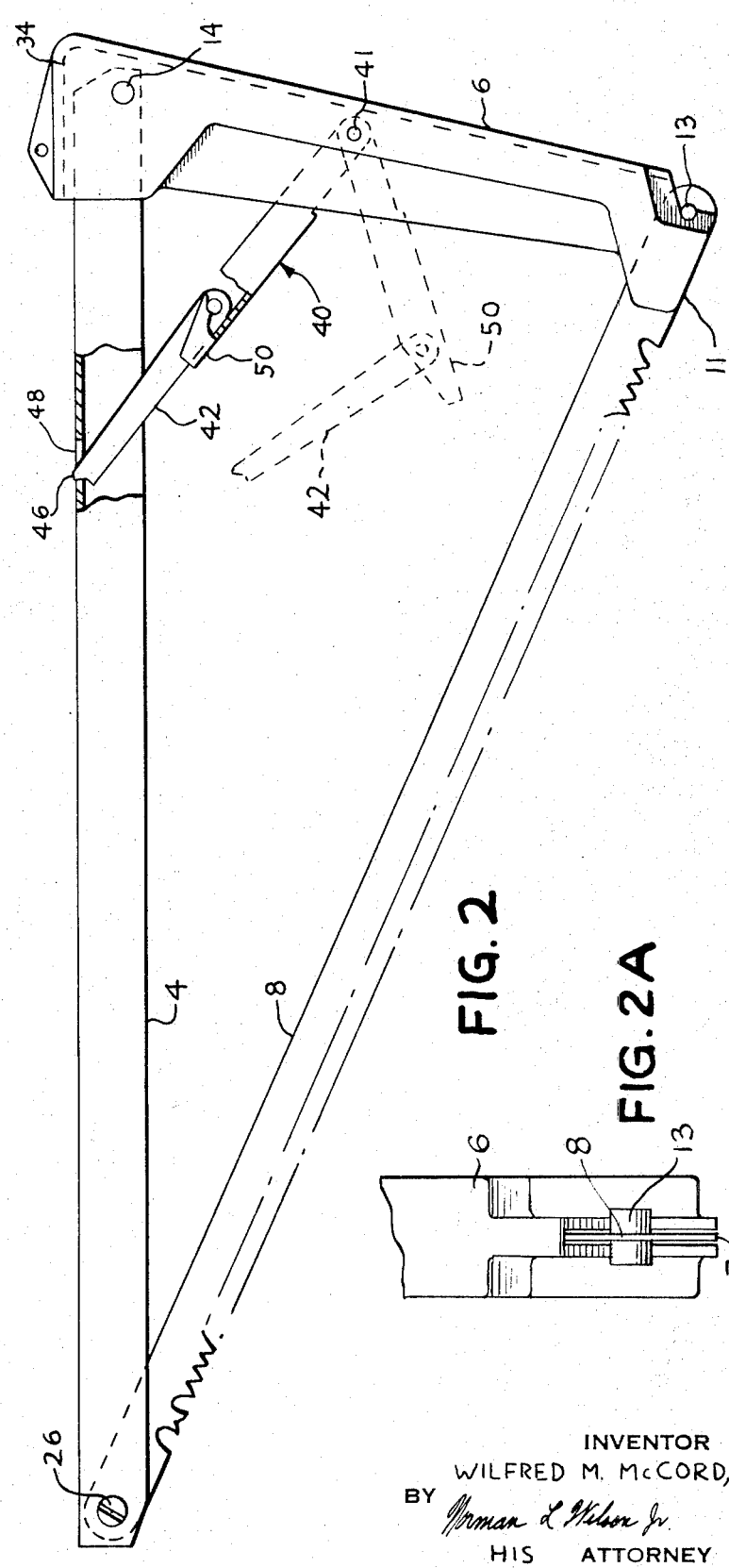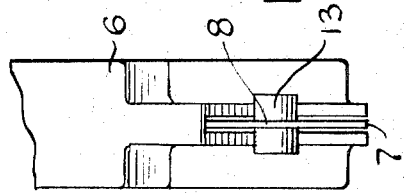

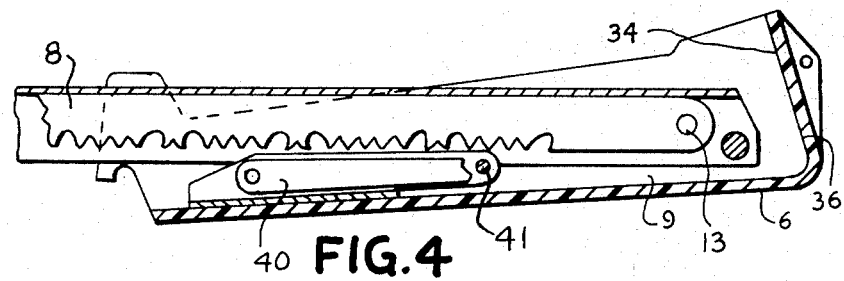
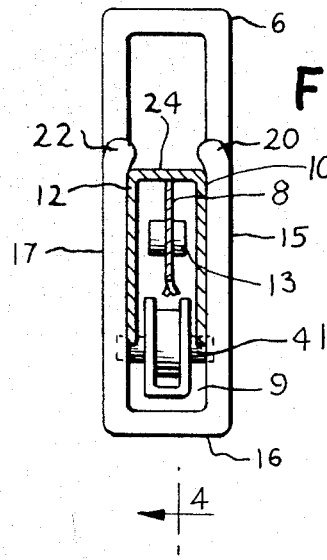
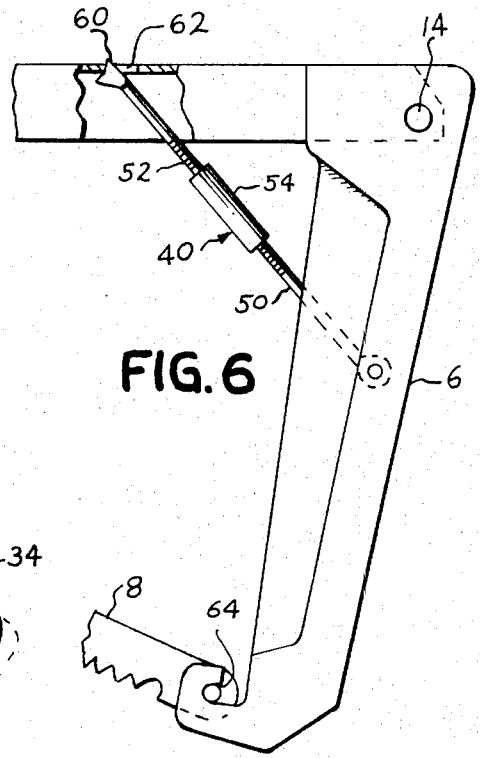
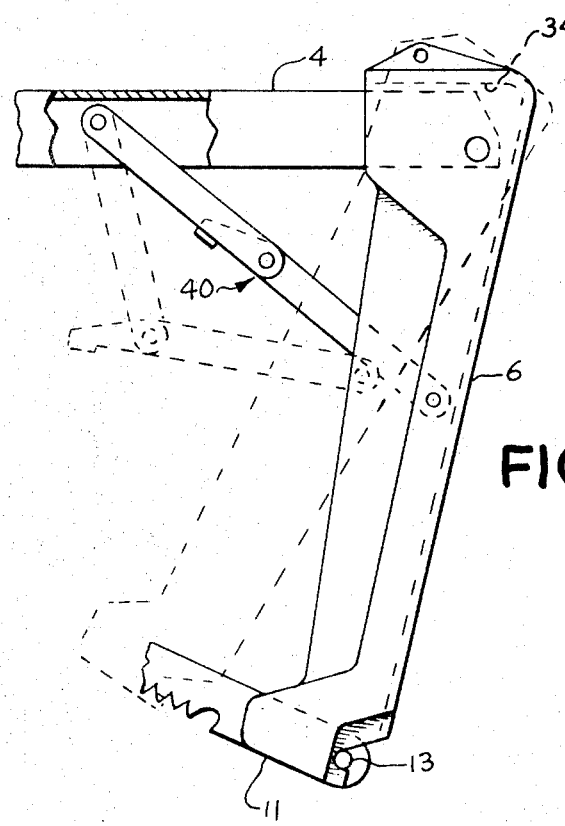

COLLAPSIBLE SAW

BACKGROUND OF THE INVENTION

This invention pertains to saws of the type which can be quickly and easily collapsed into a compact article.

With increasing amounts of leisure time, and enlarged use of campers and camping trailers, there is also a greater demand for camping equipment to be used in the trailer. One piece of camping equipment for which the need or desire is increasing is a saw which can be stored without the danger of an exposed blade. There is a growing need among campers, fishermen and hunters for saws which can be broken down for storage without loss of pieces which go into the assembled saw.

There are various types of collapsible saws. However, a study of the prior art reveals that these fall, generally, into three categories. One class is represented by U.S. Pat. No. 2,309,816 and 2,514,880, in which the blade is detached. The blade and the frame members slide inside the saw handle. This type is expensive, and actually is closer to the so-called knockdown saws.

A second class of saws is a hacksaw type illustrated by such patents as U.S. Pat. Nos. 3,250,307, 2,930,420, 2,595,288 and 1,380,628. The saws in this class have three-membered frames including a back member and two leg members, the blade being held by the ends of the leg members. The back, sides, and blade form a rectangularly or trapezoidally shaped saw. The blade may or may not be removed when these saws are collapsed.

As a third category of saws, U.S. Pat. Nos. 3,339,602, 3,245,445 and 2,781,806 are noted. This is the type of saw contemplated herein. These saws have a straight frame member and a handle pivotally connected to one end of the frame. A blade is connected across the angle formed by these two members, from the free end of the frame member to the base of the handle to form a triangularly shaped saw.

This invention is not concerned with knock-down saws, that is, those wherein the saw by being disassembled can be put into a small container for storage. As can be seen from U.S. Pat. Nos. 3,339,602 and 2,781,806, such saws consist of bars, sleeves, wingnut assemblies and the like, all of which can become misplaced. A desirable saw is, therefore, that of U.S. Pat. No. 3,245,445.

The collapsible saw of U.S. Pat. No. 3,245,445 overcomes a great many of the disadvantages of prior art units. It can be readily manufactured, and it collapses nicely into a compact unit. Unfortunately, however, it too is subject to certain disadvantages. Perhaps the most serious objection to the saw of U.S. Pat. No. 3,245,445 is that it is incapable of simple manipulation during assembly. As can be seen from FIG. 7 of the patent, in converting the saw from a collapsed to an extended position, both the handle and the blade must be swung all the way around the frame or housing in which they are stored, over 260°. Considering the fact that both of these must be positioned together, it will be appreciated that this saw becomes rather unwieldy during its assembly into an operable article. There is a danger of nicking one's hand during the operation, for instance while swinging the blade and the handle around to their assembled positions. There is also a possibility of dropping the saw or of scratching a bystander.

The saw of U.S. Pat. No. 3,245,445, like most others, is provided with a threaded blade tightening element carrying a wingnut. With this type of tensioning element there is always a probability of getting the blade so tight that the frame members are drawn up too far, and either partially bent, or, at least, subjected to undue stresses. The likelihood always exists that the user will decide to tighten the blade with pliers. Overtightening is more serious in the case of lighter weight collapsible saws than it is in the case of solid-membered conventional hacksaws having wingnut blade tightening bolts. A lesser disadvantage is that with this type of saw it is quite easy at some time or other to lose the wingnut. The foldable or collapsible saw of this invention overcomes all of these disadvantages.

SUMMARY OF THE INVENTION

Collapsible saws which utilize threaded, blade tensioning elements carrying threaded wingnuts must be made so that frame members resist inward movement. The principle upon which such threaded tensioning elements operate is that of a rigid frame which cannot be inwardly collapsed or its frame members drawn together. In the collapsible saw of this invention the handle is capable of either inward or outward movement. In U.S. Pat. No. 3,245,445 the rigidity of the saw is conferred on the device by the frame. In the case of the saw contemplated herein the rigidity of the device is a result of blade tensioning.

In the saw of this invention an elongated, hollow, open-sided frame defining a magazine housing has one of its ends pivotally connected to a handle adapted to partially nestle against the frame, as in the case of U.S. Pat. No. 3,245,445. However, in the collapsible saw herein the threaded tensioning means is eliminated. Rather, the base of the handle is provided with seating and retaining means adapted merely to receive and hold the free end of the saw blade. The invention also contemplates blade attachment means permitting the free end of the saw blade in its operable position to seat in the seating and positioning means after the blade has moved through only a very small arc. In conjunction with the blade attachment means the invention incorporates handle attachment means permitting the handle to be positioned to receive the free end of the saw blade in the handle seating and retaining means, and with the handle having to be circumvolved through only a small arc. Expanding lever means are positioned across the angle formed by the frame and the handle in their operable positions, biasing and tensioning the blade. Stop means cooperates with the lever means, locking the handle and the frame in said biased position.

DETAILED DESCRIPTION OF THE INVENTION

In the collapsible saw of U.S. Pat. No. 3,245,445 a rigid frame of the type which will sustain the stresses imposed upon it when the blade tensioning element is tightened results only when the handle is swung around from the open side of the frame to the bight side of the frame member. The angle formed by the handle and the frame member and spanned by the blade must be incapable of becoming smaller during blade tensioning. In the collapsible saw of this invention a different mode of construction is utilized. This will be more readily un- FIG. 1 is a side elevational view partly in section of a saw of the invention in the collapsed position.

FIG. 2 is a side elevational view, again partly in section, of the saw in the extended or operable position.

FIG. 2A is an end view of the nose of the handle shown in FIG. 2.

FIG. 3 is a transverse sectional view taken on lines 3—3 of FIG. 1.

FIG. 4 is a longitudinal sectional view taken on lines 4—4 of FIG. 3.

FIGS. 5 and 6 show different embodiments of the invention.

Referring now to the drawings, the saw 2 in its collapsed position is shown in FIG. 1. Saw 2 includes a barlike frame member 4 of channel stock, a plastic or metal handle 6 and a blade 8. Handle 6 is also channel shaped, being provided with a longitudinal channel 9 formed by sides 15 and 17 and bight 16 as seen in FIG. 3. By use of such handle attachment means as a transverse bolt, mounting pin or rivet 14 one end of handle 6 is so connected to an end of frame member 4 that it is susceptible of easy swiveling. Longitudinal handle channel 9 (FIG. 3) is sized so that in the collapsed position shown in FIG. 1 frame member 4 is snugly disposed therein. Ends 20 and 22 at the base of handle 6 overlap the top of the frame slightly, as shown in FIG. 3, to hold the saw tightly in the collapsed position.

Frame member 4 thus is an elongated, hollow, open-sided frame defining a magazine housing, the housing being formed by sides 10 and 12 and bight portion 24. Referring again to FIG. 3, it can be seen that when the saw is in the collapsed position of FIG. 1, the bight portion 24 of elongated frame member 4 is away from bight portion 16 of the handle, forming in cross section, the rectangle seen in FIG. 3. The saw blade 8 which is carried within the frame housing is consequently carried inside the housing, being pivotally connected by blade attachment means to the end of frame 4 away from the end which has handle 6 attached. Blade attachment means, for example, a mounting pin, rivet or bolt 26 similar to that pivotally connecting the handle to the frame can be fastened transversely through the frame tip. Desirably the saw blade, while pivotal, should be prevented from sidewise movement within the frame end. To this end, filler pieces can be mounted within the channel on each side of blade 8, or a portion of bight 24 can be cut away to form flanged tips at 26 to be drawn together against blade 8.

Referring first again to FIG. 1, it can be seen that when the saw is collapsed blade 8 is housed in the magazine with its cutting edge not against, but away, from the inside of bight portion 24. It will be apparent comparing FIG. 1 with FIG. 2, then, that blade 8 is not swung all the way around the housing. The blade attachment means permits the free end of blade 8 merely to circumvolve through an arc from inside housing 4 to the base of handle 6. Obviously, regardless of the saw's dimensions, blade 8 will come to rest or seat in the base of handle 6 before it has moved through an arc of $\pi/3$ radians. The seating of the blade in its preferred manner in seat 15 (FIG. 1) is shown in FIG. 5. It can be seen that saw blade 8 will be moved through an angle slightly larger than the angle formed when the saw blade seats. The blade must clear the handle and then be pushed back toward frame 4 to seat in slot 7 in nose 11 of handle 6. Slot 7 is best seen in FIG. 2A. This is an end view of nose 11 of FIG. 2, looking toward pin 13 from behind handle 6.

The arc through which handle 6 swivels is determined by the length of blade 8. However the handle attachment means allows even long blades to be secured in the base of the handle before it circumvolves through an arc as large as $2\pi/3$ radians upon pivotal movement of the handle to its operable position from its collapsed position against the frame. It is to be understood, as can be seen in FIG. 6, that a handle stop is unnecessary in the saw of this invention because of the nature of the tensioning means employed. Nevertheless, in order to keep the saw from being unwieldy, longitudinal channel 9 defined by longitudinal bight surface 16 desirably terminates in a transverse bight surface 34 at an angle thereto (FIG. 4). When the handle has swung just beyond its operable position the transverse surface 34 of bight portion 36 will rest against the end of upper bight portion 24 of frame 4, as will be visualized looking at FIG. 2. This prevents the saw from swinging or bending around while it is being assembled. Transverse bight portion 36 must be spaced from the top of frame 4 to afford the clearance for effective operation of the tensioning means.

The seating and retaining means can best be seen in FIG. 2. Any simple means so long as it is correctly positioned such as recess 15 can be utilized to connect blade 8 detachably to the base end of handle 6 when both have moved through arcs which permit them to seat. As seen in FIG. 2, the base end of handle 6 is in the form of nose 11 which is slotted in its own plane, blade 8 being received in said slot in any desired manner. In the aspect shown in FIG. 2 the slot is the width of a blade, and blade 8 is secured or retained in the slot by pin or stud 13 which is seated in an open end recess 15.

Consideration will now be accorded tensioning means 40. Basically this biasing means is an expanding lever device operating between frame 4 and handle 6. It will be appreciated, of course, that a relationship exists between the length of the blade and the length of lever device 40. If a long blade is used the angle formed by the frame and the handle will be larger. Hence the lever device across this angle must be longer. There is also a relationship between the strength of the lever device, that of the blade securing means, and that of the frame. In addition it should be emphasized that by virtue of the bending moments resulting from use of this wedging action greater blade tensioning can be achieved per handle cross-sectional area. As an example the maximum bending moment of the handle of U.S. Pat. No. 3,245,445 is roughly 700 inch pounds per 100 pounds of blade tension whereas in the saw of this invention the maximum handle bending moment is roughly only 525 inch pounds. Obviously the wedging action conferred by the lever device cannot be so great that either frame 4 is bent, or the attachment means at the base of the handle 6 gives way. This will be a concern of the manufacturer, however, and not the user.

Any of the various available expanding lever devices can be employed if they include, i.e. are coupled in some fashion with, a locking means which cooperates with the lever device to maintain the biased condition. Desirably lever device 40 is swivelly connected within handle 6 by pin or rivet 41. A preferred lever device is a joined lever such as a toggle assembly. For the action of such toggles attention is drawn to toggle assembly 42 in FIG. 2. The appearance of toggle 42 as it is withdrawn from handle 6 for placement in its locking position is shown in broken lines in the figure. Locking means 50 is clearly visible in this view. It will be noted that in this embodiment toggle lever 42 is provided at its end with tip or projecting edge 46. Frame 4 in turn is provided with a rectangular opening 48 which receives projecting tip 46. The edge of tip 46 bears upwardly against the perimeter of opening 48 as shown in FIG. 2 so that the lever will not slip when locked in place. Since the desired levers are off-center devices, locking means such as stop 50 prevents them from bending further inwardly and thereby loosening. Desired lever devices are of course capable of folding or otherwise nesting within longitudinal channel 9 of handle 6 as shown in FIG. 4. The lever device also performs an additional function. In the folded position shown in FIG. 4 lever device 40 urges blade 8 further inside the frame channel toward bight 24.

Whereas a lever device pivotally connected within the handle has been shown, it will be appreciated that other modifications are possible. Thus the toggle can be connected at both ends for pivotal movement within the frame and the handle as shown in FIG. 5. The toggle pivotal connection also can be within the frame only, with stopping means carried within the handle. Other lever devices are also possible. For instance a leaf spring, provided with stopping means therefor, can be attached at one of its ends to either the frame or handle. Another lever device is illustrated in FIG. 6. This device consists of threaded members 50 and 52 along with a sleeve 54. Turning sleeve 54 urges tip 60 against the edge of rectangular opening 62 to bias or tension the blade.

Several other variations are also possible within the spirit of this invention. As an example the saw blade can be of a cross-cut, rip, hack, or other type. In addition the handle and frame channels can be deep or shallow depending upon the nature of the blade or lever device to be housed therein. Moreover, instead of rectangular opening 48 a locking tab can be struck by indenting the metal bight portion. Other locking tabs will also occur to those skilled in the art. Various seating and retaining means allowing the blade to seat in the handle will also be obvious. Thus pins can be carried by either the blade or the handle. The variation shown in FIG. 6 shows a seating means which adds to the length of the blade used. In this aspect of the invention the slot and notched portion 64 are in front of the handle. In a particularly desirable embodiment of the invention the blade never leaves the handle. Handle channel 9 is made with a longitudinal groove therein. A stud through the hole in the end of the saw blade glides in the groove and thereby keeps the blade end inside the handle. In the closed position the blade is at the top of the groove near the handle-frame connection. As the saw is opened, the stud, carrying the blade with it, glides along the groove toward the handle base and into a locked position in it. Such modifications and other ramifications will occur to those skilled in the art.

What is claimed is:

1. In a collapsible
   with of the type having an elongated, hollow, open-sided frame with two approximately parallel side portions connected by a bight portion to form a magazine housing;
   a handle capable of being attached to one end of said frame, and circumvolving between a closed position against the frame, and an open operable position away from the frame at an angle thereto; and
   a saw blade capable of being attached across the angle at the frame end and at the handle end, and circumvolving between a closed position within the magazine housing, and an open position out of the magazine housing;
   in combination:
   a. seating and retaining means adapted to receive and hold the handle end of the saw blade at the base of the handle when the blade and the handle are in their open operable positions;
   b. blade attachment means pivotally securing the handle end of the saw blade to its frame end so that the teeth of the blade are facing away from the bight portion of the frame, and so that the handle end of the saw blade can be held in said seating and retaining means without the blade having to circumvolve away from the frame to its open operable position through an arc as large as $\pi/3$ radians;
   c. handle attachment means pivotally securing the handle to the frame so that the blade end can be held in said seating and retaining means without the handle having to circumvolve away from the frame to its open operable position through an arc as large as $2\pi/3$ radians;
   d. expanding lever means adapted to be positioned across an angle formed by the frame and the handle in their open operable positions, urging the handle and the frame further apart when the blade is seated biasing and tensioning the blade; and
   e. stop means included in said lever means, cooperating with said lever means, locking with handle and frame in said biased position.

2. The collapsible saw of claim 1 wherein the blade attachment means includes pin means swivelly securing the blade to the frame.

3. The collapsible saw of claim 1 wherein the handle attachment means includes pin means swivelly securing the handle to the frame.

4. The collapsible saw of claim 1 wherein the expanding lever means is a toggle assembly.

5. The collapsible saw of claim 1 wherein the seating and retaining means is a nose portion in the base of the handle having a transverse slot therein the width of the saw blade, in combination with a stud carried by the blade, said slot terminating in a notch at the end thereof away from the frame adapted to receive said stud.

* * * * *